US009049201B1

(12) United States Patent
Kunath et al.

(10) Patent No.: US 9,049,201 B1
(45) Date of Patent: Jun. 2, 2015

(54) COMMUNICATION BETWEEN INTEGRATED DEVICE AND MOBILE APPLICATION CLIENT ON MOBILE PERSONAL COMMUNICATION DEVICE

(71) Applicants: Uwe Kunath, Markkleeberg (DE); Srdjan Boskovic, Heidelberg (DE); Christoph Persich, Dubai (AE); Ralph Resech, Rauenberg (DE); Karl Christian Roediger, Dielheim (DE); Martin Hirtle, Rheinfelden (DE); Michael Habermueller, Bottrop (DE)

(72) Inventors: Uwe Kunath, Markkleeberg (DE); Srdjan Boskovic, Heidelberg (DE); Christoph Persich, Dubai (AE); Ralph Resech, Rauenberg (DE); Karl Christian Roediger, Dielheim (DE); Martin Hirtle, Rheinfelden (DE); Michael Habermueller, Bottrop (DE)

(73) Assignee: SAP SE, Walldorf (DE)

( * ) Notice: Subject to any disclaimer, the term of this patent is extended or adjusted under 35 U.S.C. 154(b) by 296 days.

(21) Appl. No.: 13/705,908

(22) Filed: Dec. 5, 2012

Related U.S. Application Data (63) Continuation of application No. 12/649,664, filed on Dec. 30, 2009, now Pat. No. 8,352,949.

(51) Int. Cl.
  *G06F 9/46*  (2006.01)
  *G06F 15/16* (2006.01)
  *H04L 29/06* (2006.01)
  *G06F 9/48*  (2006.01)

(52) U.S. Cl.
  CPC .......... *H04L 65/1013* (2013.01); *G06F 9/4881* (2013.01); *H04L 69/18* (2013.01)

(58) Field of Classification Search
  CPC .............................. G06F 9/4881; H04L 69/18
  See application file for complete search history.

(56) References Cited

U.S. PATENT DOCUMENTS

| 5,689,730 | A  |    | 11/1997 | Wakasugi |
| 5,995,102 | A  |    | 11/1999 | Rosen et al. |
| 6,003,065 | A  |    | 12/1999 | Yan et al. |
| 7,313,600 | B1 | *  | 12/2007 | Tannous ........................ 709/217 |
| 7,568,203 | B2 |    |  7/2009 | Dotan et al. |
| 7,653,683 | B2 |    |  1/2010 | Armstrong et al. |

(Continued)

OTHER PUBLICATIONS

'ActiveX' [online]. Wikipedia, 2007, [retrieved on Jan. 13, 2010]. Retrieved from the Internet: <URL: web.archive.org/web/20071130135420/http:/en.wikipedia.org/wiki/Activex>, 3 pages.

(Continued)

*Primary Examiner* — Camquy Truong
(74) *Attorney, Agent, or Firm* — Fish & Richardson P.C.

(57) ABSTRACT

Communication between an integrated device and a mobile application client on a mobile personal communication device involves a command generated using a mobile application client implemented by non-managed code. The command is received by an operating system, is socket based and conforms with a standard network communications protocol. The command is forwarded to an intermediate module implemented by code executed on the mobile personal communication device and configured for socket based communication according to the standard network communications protocol. After receiving the command, the intermediate module generates a command communication, for receipt by the peripheral device, according to a protocol specific to the peripheral device. The command communication instructing the peripheral device to perform an operation corresponding to the command. The operation is performed using the peripheral device upon receiving the command communication.

20 Claims, 6 Drawing Sheets

(56) References Cited

U.S. PATENT DOCUMENTS

| | | | |
|---|---|---|---|
| 2003/0067621 | A1 | 4/2003 | Tanaka |
| 2005/0024673 | A1 | 2/2005 | Sakai |
| 2007/0191002 | A1 | 8/2007 | Ge et al. |
| 2009/0109978 | A1 | 4/2009 | Zhu et al. |
| 2010/0318543 | A1* | 12/2010 | Chaudhuri et al. ........... 707/759 |

OTHER PUBLICATIONS

'ActiveX' [online]. Wikipedia, 2010, [retrieved on Jan. 13, 2010]. Retrieved from the Internet: <URL: en.wikipedia.org/wiki/ActiveX#History>, 4 pages.

'iPic Web Server Aims to make Toaster-Net a Reality' [online]. Serverwatch.com, 1999, [retrieved on Jan. 13, 2010]. Retrieved from the Internet: <URL: http://www.serverwatch.com/news/article.php/1399091/iPic-Web-Server-Aims-to-Make-Toaster-Net-a-Reality.htm>, 3 pages.

'ITSmobile Services' [online]. SAP, 2004, [retrieved on Jan. 12, 2010]. Retrieved from the Internet: <URL: help.sap.com/saphelp_nw04/helpdata/en/46/6c394e41496a58e10000000a11466f/con>, 1 page.

'Managed, Unmanaged, Native: What Kind of Code is This?' [online]. Developer.com, 2003, [retrieved on Jan. 13, 2010]. Retrieved from the Internet: <URL: .developer.com/net/cplus/print.php/2197621>, 3 pages.

'PIOS API Core (SAP Library Peripheral Input Output Services Architecture)' [online]. SAP Collaboration Workspace, 2008, [retrieved on Jan. 13, 2010]. Retrieved from the Internet: <URL: //cw.sdn.sap.com/cw/docs/DOC-31139>, 3 pages.

SAP, "SAP NetWeaver Mobile 7.1: Frequently Asked Questions," Jun. 2009, 59 pages.

'SAP NetWeaver'04: Mobile Infrastructure 2.5' [online]. SAP, 2004, [retrieved on Jan. 13, 2010]. Retrieved from the Internet: <URL: .sdn.sap.com/irj/scn/go/portal/prtroot/docs/library/uuid/78a5ec90-0201-0010-ddb0-a8e4cb4593b2?QuickLink=index&overridelayout=true>, 34 pages.

'SAP NetWeaver 2004 SPS23; ITS Mobile' [online]. SAP, 2004, [retrieved on Jan. 13, 2010]. Retrieved from the Internet: <URl: help.sap.com/saphelp_nw04/helpdata/en/47/b2c674f1f33b8be10000000 a421937/frameset.htm>, 2 pages.

'The Proof-of-concept Miniweb TCP/IP Stack' [online]. Miniweb, 2005, [retrieved on Jan. 13, 2010]. Retrieved from the Internet: <URL: www.sics.se/~adam/miniweb/>, 3 pages.

Guinard and Trifa, Towards the Web of Things: Web Mashups for Embedded Devices, WWW 2009, Apr. 20-24, 2009, Madrid Spain, 8 pages.

'Serial Peripheral Interface Bus' [online]. Wikipedia, 2008, [retrieved on Mar. 2, 2010]. Retrieved from the Internet: <URL:web.archive.org/web/20080208193159/http:/en.wikipedia.org/wiki/Serial_Peripheral_Interface_Bus>. 8 pages.

'Bluetooth' [online]. Wikipedia, 2008, [retrieved on Mar. 2, 2010]. Retrieved from the Internet: <URL.web.archive.org/web/20080414072302/http:/en.wikipedia.org/wiki/Bluetooth: >, 13 pages.

* cited by examiner

COMMUNICATION BETWEEN INTEGRATED DEVICE AND MOBILE APPLICATION CLIENT ON MOBILE PERSONAL COMMUNICATION DEVICE

CROSS-REFERENCE TO RELATED APPLICATION

This patent application is a continuation of, and claims the benefit of priority from, patent application Ser. No. 12/649,664 (now U.S. Pat. No. 8,352,949), filed Dec. 30, 2009, and entitled "Communication Between Integrated Device And Mobile Application Client On Mobile Personal Communication Device," the entire contents of which are hereby incorporated herein by reference.

TECHNICAL FIELD

This document relates to communication between an integrated device and a mobile application client.

BACKGROUND

Personal digital devices are used in many different situations. For example, a person can carry a cellular telephone or smartphone that by wireless connection provides access to network services and other resources in a wide geographic area. Such devices are sometimes used in business and sometimes for personal purposes. For example, sales agents or other traveling company representatives can be provided with a smartphones that synchronize with the company's computer system. Warehouse workers can use handheld PDAs for tracking of goods movement or inventory, a nurse may use a PDA for controlled dispense of drugs, or a smartphone to check if medicament is authentic or not.

Software can be designed for one or more kinds of mobile devices. A company can use a specialized software client on the cell phone that connects with the main computer system. For example, SAP AG NetWeaver® Mobile and ITSmobile are examples of client applications compatible with its SAP's solutions.

Portable digital devices make use of mobile peripheral devices to perform their functions, For example, a cell phone is equipped with a speaker, a display and a microphone that are controlled by the processor inside the phone. Some phones also have cameras. Specific mobile devices can have highly specialized peripheral components, for example a fingerprint reader, an RFID reader, a barcode scanner, GPS receiver, camera or a printer. A peripheral device transforms for example a radio signal (RFID or GPS) or a visible light signal (bar code, photo) into an electrical signal, which is then typically transformed into binary data, using a processing unit embedded into peripheral devices (electronic circuits, microcontrollers, microcomputers . . . ). The processing unit of the mobile peripheral device provides communication so that binary representations of physical values can be read from the device, or so that some configuration parameters of the device can be set. The user of mobile peripherals' communication channels is typically a mobile application, which needs to understand the communication protocol of the peripheral device.

When mobile devices are manufactured, the peripheral devices to be integrated in the device are often obtained from third-party vendors. Moreover, such devices often are configured to use a device-specific communication protocol, and a special driver library is created for the mobile device. In general, mobile applications need to be tested for every peripheral device they are supposed to support, which increases the cost of development and maintenance, and makes the application more complex. As another example, peripheral devices can make it more labor intensive to accomplish portability of applications across devices and platforms.

However, in a mobile device intended for use with several different client applications, the device functionality as exposed to applications in the mobile device is not optimized for any of the mobile applications. Rather, the device vendor often provides a software development kit (SDK) for use in integrating the device functionality in the mobile application.

Such integration generally cannot be made by the mobile device vendor, because they lack sufficient detail knowledge about the mobile application. Also, in situations where the mobile client is created by an enterprise resource planning (ERP) solutions vendor, for example SAP, such a vendor is not directly involved in selecting or designing the third-party peripheral device, and so has less ability and incentive to customize the device using the SDK. As a result, a third party consultant is often engaged to integrate the peripheral device functionality in the mobile application. This can lead to a slower or more complicated implementation process, and it can increase the overall cost for the implementation.

As another example, with such an integration the peripheral device becomes very tightly bound to the mobile application; the device functionality is compiled together with the mobile application. This means that when a mobile application that is designed for one mobile hardware platform should be extended to another platform, not only must the mobile application essentially be coded again, but so must the integration of the peripheral because it is so closely connected with the mobile application.

SUMMARY

In some implementations, an intermediate module is introduced between a mobile application and a mobile peripheral. The intermediate module has a twofold nature of communication: with mobile peripheral devices it communicates using the protocols and communication technology of the peripheral; with mobile applications it communicates using a protocol which can be standardized for all mobile application platforms and applications. For example, data can be transferred in any format (e.g. XML) using the protocol stack HTTP and TCP/IP or UDP. As another example, on top of XML-formatted data which is transferred using UDP/TCP and IP, a different protocol can be used, e.g. SOAP or any other specific high level protocol which uses XML as a foundation.

In a first aspect, a computer-implemented method for communication between an integrated device and a mobile application client on a mobile personal communication device includes generating, using a mobile application client implemented by non-managed code executed on a mobile personal communication device, a command for receipt by an operating system of the mobile personal communication device, the command being socket based and conforming with a standard network communications protocol. The method includes forwarding the command from the operating system to an intermediate module implemented by code executed on the mobile personal communication device, the intermediate module configured for socket based communication according to the standard network communications protocol, the command addressed to an address assigned to a peripheral device of the mobile personal communication device. The method includes generating, using the intermediate module and after receiving the command, a command communication for receipt by the peripheral device, the command communication being generated according to a protocol specific to the peripheral device and instructing the peripheral device to perform an operation corresponding to the command. The method includes performing the operation using the peripheral device upon receiving the command communication.

Implementations can include any or all of the following features. The peripheral device includes at least one device selected from: readers, RFID readers, barcode readers, fingerprint readers, sensors, movement sensors, vibration sensors, gyroscopes, temperature sensors, detectors, antennas, receivers, GPS receivers, cameras, microphones, printers, displays, projectors, speakers, and combinations thereof. The peripheral device is integrated in a common physical housing with the mobile personal communication device. The method further includes generating, using the peripheral device after the operation, a response communication for receipt by the intermediate module according to the protocol specific to the peripheral device; generating a response using the intermediate module for receipt by the operating system, the response (i) corresponding to the response communication, (ii) being socket based and (iii) conforming with the standard network communications protocol; and forwarding the response from the operating system for receipt by the mobile application client. The peripheral device is configured to generate signals or data, wherein the command includes an HTTP request, wherein the response communication includes the signals or data from the peripheral device, and wherein the response includes an HTTP response to the mobile application client. The HTTP request and the HTTP response are generated in a socket created between the mobile application client and the intermediate module, both of which are running in a memory and a file system space of one hardware platform on the mobile personal communication device.

The code of the intermediate module is managed and the intermediate module operates in a virtual machine, and wherein the virtual machine is implemented in a .NET framework.

The code of the intermediate module is non-managed and the intermediate module is not included in a virtual machine.

The operating system has direct access to multiple peripheral devices including the peripheral device, and wherein the intermediate module comprises a code-based mobile peripheral manager which is embedded in the operating system. The intermediate module is implemented in a layer above the operating system, the layer unifying APIs of multiple peripheral devices on a device side by exposing functionality of the multiple peripheral devices to the mobile application on an application side. The mobile application client is implemented in a browser running on the mobile personal communications device, and wherein the mobile application client is implemented as javascript code in the browser. The browser is provided with a plug-in application in the mobile personal communications device, the plug-in application enabling communication between the browser and the intermediate module using a specific standard communication protocol, wherein the intermediate module is configured to exchange the command and a response to the command using the specific standard communication protocol. The intermediate module is configured to alternate between the specific standard communication protocol and the standard communication protocol. The intermediate module is configured to handle first and second application communications in parallel, the first communication using the specific standard communication protocol and the second communication using the standard communication protocol.

In a second aspect, a computer program product tangibly embodied in a computer-readable storage medium includes instructions that when executed by a processor perform a method for communication between an integrated device and a mobile application client on a mobile personal communication device. The method includes generating, using a mobile application client implemented by non-managed code executed on a mobile personal communication device, a command for receipt by an operating system of the mobile personal communication device, the command being socket based and conforming with a standard network communications protocol. The method includes forwarding the command from the operating system to an intermediate module implemented by code executed on the mobile personal communication device, the intermediate module configured for socket based communication according to the standard network communications protocol, the command addressed to an address assigned to a peripheral device of the mobile personal communication device. The method includes generating, using the intermediate module and after receiving the command, a command communication for receipt by the peripheral device, the command communication being generated according to a protocol specific to the peripheral device and instructing the peripheral device to perform an operation corresponding to the command. The method includes generating performing the operation using the peripheral device upon receiving the command communication.

In a third aspect, a mobile personal communication device includes a housing; a processor in the housing; and a tangible storage device integrated with the mobile personal communication device in the housing. The tangible storage device includes code that when executed by the processor generates an intermediate module configured to receive, from a mobile application client implemented by non-managed code to be executed by the processor on the mobile personal communication device, a command that (i) is socket based, (ii) conforms with a standard network communications protocol, and (iii) is addressed to an address assigned to the peripheral device, wherein in response to the intermediate module generating a command communication for receipt by the peripheral device according to a protocol specific to the peripheral device, the peripheral device is to perform an operation corresponding to the command.

Implementations can include any or all of the following features. The code of the intermediate module is managed and the intermediate module operates in a virtual machine, and wherein the virtual machine is implemented in a .NET framework. The code of the intermediate module is non-managed and the intermediate module is not included in a virtual machine. The mobile personal communications device includes an operating system that has direct access to multiple peripheral devices including the peripheral device, and wherein the intermediate module comprises a code-based mobile peripheral manager which is embedded in the operating system. The intermediate module is implemented in a layer above an operating system of the mobile personal communications device, the layer unifying APIs of multiple peripheral devices on a device side by exposing functionality of the multiple peripheral devices to the mobile application on an application side.

Implementations can provide any or all of the following advantages. Peripheral devices can be exposed as a standardized layer, for example HTTP, to applications in a mobile device. Peripheral-device features in a mobile application can be made device independent. Upgrading of mobile applications, and exchange of peripheral devices, can be simplified. Peripherals of very different nature, like a camera and a GPS receiver, may be operated with very similar protocols, as perceived from the mobile application's perspective, which simplify mobile application.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
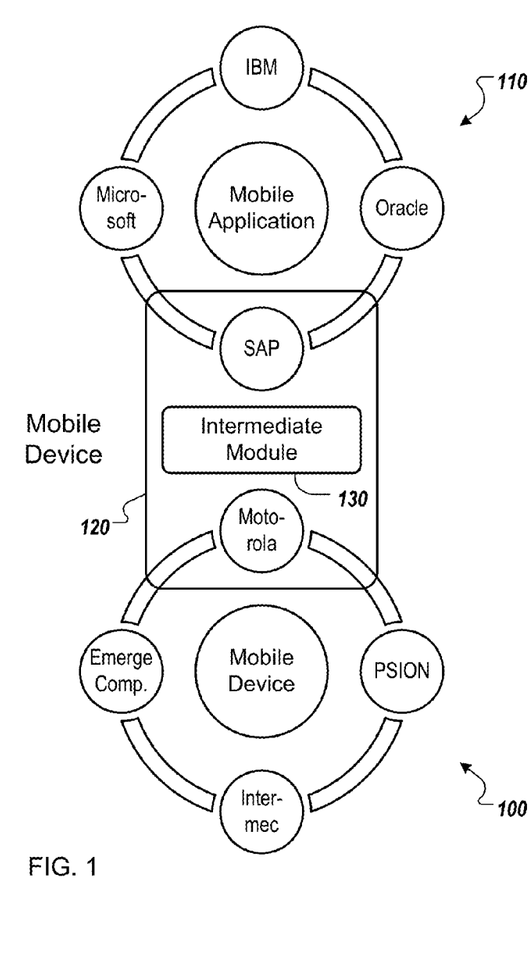
FIG. 1 conceptually shows examples of vendor realms of mobile devices and mobile applications, respectively.

FIG. 1 conceptually shows examples of vendor realms of mobile devices and mobile applications, respectively. Here, a mobile device vendor realm 100 is shown as including arbitrary mobile vendors A-D. This illustrates that the realm 100 includes a wide variety of vendors, each of which manufactures mobile devices that may be used for similar purposes, but whose platforms or other technologies are vendor specific. Similarly, a mobile application vendor realm 110 includes arbitrary vendors E-H, each of which develops mobile application that may be used for similar purposes, but whose functionality and other coding aspects are vendor specific. A mobile device 120, then, implements aspects from both vendors and can conceptually be seen as an intersection of the realms 100 and 110. People carry mobile communication devices for private as well as business purposes, such as in the telecom, logistics and healthcare fields.

Particularly, the mobile device 120 from one specific mobile device vendor that should run a mobile application from one specific mobile application vendor must have a way for the application to properly interact with the device. In particular, the application should be able to flexibly, reliably and efficiently make use of the functions provided by any peripheral device that the mobile device vendor integrates in, or otherwise associates with, the mobile device. Examples herein will describe how this can be done by implementing a component such as intermediate module 130 in the mobile device, for example to expose peripheral functionality to the mobile application in form of a commonly used standard communication protocol such as http. This can be described in terms of providing the peripheral device as a service on the mobile device.

Implementations of methods and technology described herein can be used with any of a variety of peripheral devices for mobile devices. Examples of peripheral devices include, but are not limited to: readers, RFID readers, barcode readers, fingerprint readers, sensors, movement sensors, vibration sensors, gyroscopes, temperature sensors, detectors, antennas, receivers, GPS receivers, cameras, microphones, printers, displays, projectors, speakers, and combinations thereof.

Figure 2:
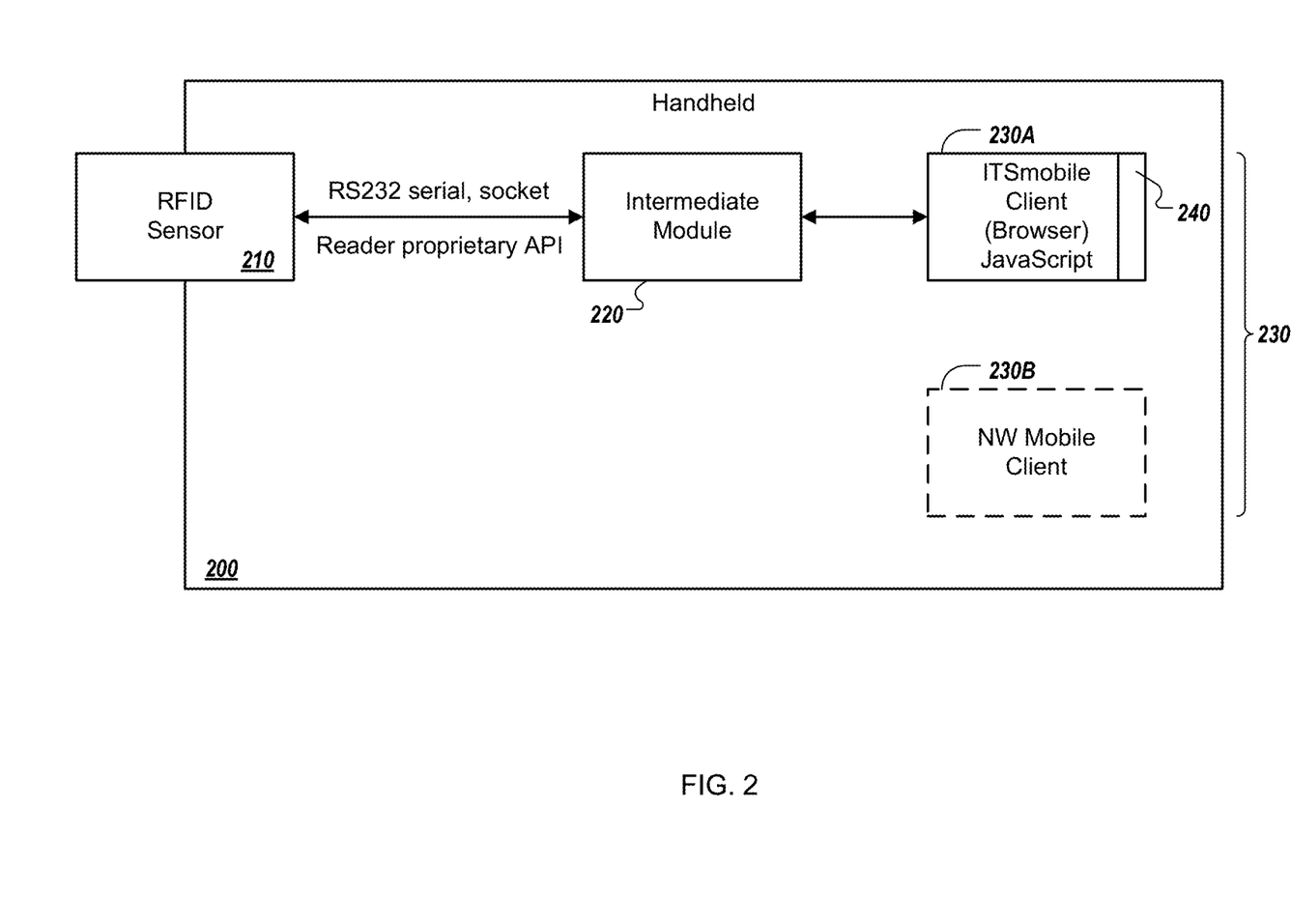
FIG. 2 shows a block diagram of an example handheld device.

FIG. 2 shows a block diagram of an example handheld device 200. In some implementations, the device 200 corresponds to some mobile device designed to run one or more mobile applications, for example the mobile device 120 (FIG. 1). The device 200 can include one or more peripheral devices. In some implementations, a peripheral device can include a sensor of any kind, such that the peripheral when in operation delivers a signal or data to the device 200 corresponding to what is being sensed. Here, the device 200 includes an RFID sensor 210. In some implementations, the handheld device 200 with the RFID sensor 210 is selected for use in a particular business context, for example to manage logistics of goods, equipment or other resources labeled with RFID tags. In such examples, then, the device can be intended for use in detecting the presence or absence of various RFID-tagged objects. The information about the RFID-tagged objects is then to be registered and used for one or more business purposes.

The RFID sensor 210 has an intermediate module 220 in the handheld device 200, which can for example include a driver configured for the particular peripheral device. The intermediate module 220 can be termed a client with regard to the RFID sensor 210, because the intermediate module is compatible with the RFID sensor communication and can control the sensor's operation and receive data or other signals from the sensor. The intermediate module 220 is here executed as a process in the memory and file system space provided by the hardware platform of the mobile device 200.

The RFID sensor 210 is here designed to communicate with the intermediate module 220 using a proprietary protocol. In this example, it is indicated that the RFID sensor 210 has a reader proprietary API. The intermediate module 220 can here interact with the reader proprietary API through a socket, such as by a serial connection. Any suitable connection between the RFID sensor 210 and the intermediate module 220 can be used.

TCP and UDP belong to the Transport Layer of Internet communication protocols, and both use IP of Internet Layer. Both TCP and UDP use sockets for communication. TCP is connection oriented and designed for reliable transfer of data packets over the network, while UDP does not have transmission control and is typically used for transmission of single datagrams. If needed, a transmission control can be added in an application layer, on top of UDP. A socket is a connection between a client application or process and a server application or process. A socket connection is established using IP addresses of hosts (machines) on which client and server processes run. If both run on the same machine (device), the IP of the local host can be used, e.g., 127.0.0.1. Both client and server process can write (send) data to the socket or read (receive) data from the socket. The process that should receive data, typically on the server, can implement socket listening functionality to handle the received data. Both processes, client and server, can read/write from/to socket.

One or more mobile application clients 230 can be implemented on the mobile. At least one client is implemented in a non-managed way, as native code in the handheld device 200. For example, the mobile application client 230A is not implemented in a virtual machine, which would be required if the mobile application were coded in a certain language such as Java, developed by Sun Microsystems. Rather, the mobile application client 230A is here created using another language that does not require a virtual machine on the handheld machine, such as C++. As another example, the mobile application client 230A can be implemented using JavaScript code that is executed inside a browser on the handheld device 200. Another mobile application, in turn, can be implemented on the handheld device in a managed, or non-managed way. For example, the mobile application 230B here includes the SAP NetWeaver® Mobile client implemented using Java language, such that the mobile application client 230B runs in a virtual machine on the handheld device 200.

The mobile applications are termed clients in the sense that they can be part of a client-server architecture with a remote computer system, for example a ERP system also designed by the vendor of the mobile application. As such, the mobile application 230A, which is non-managed, should be executed as a process in the memory and file system space provided by the hardware platform of the mobile device 200 much as the intermediate module 220 is run. In other words, the mobile application 230A and the intermediate module 220 are in this implementations processes running side-by-side in the handheld device 200.

The mobile application client 230 can include any client program that is compatible with the handheld device 200 and its operating system. Here, for example, the SAP ITSmobile client 230A and the SAP NetWeaver® Mobile client 230B are shown, which are sometimes alternative implementations depending on customer ERP system and mobile needs. The SAP ITSmobile client 230A is an example among many browser based clients that can be run on the handheld device 200.

The mobile application client 230A communicates with the intermediate module 220 using a common and well established socket-based protocol. Examples of sockets include Internet (IP) and (Unix) domain sockets. An IP socket client can connect to the intermediate 130 (FIG. 1) on the same or another device. In an implementation involving domain sockets, client and server can be in the same machine, share the file system and address space. In some implementations, TCP/IP or UDP can be used.

The intermediate module 220 is configured to communicate with either or both of the mobile application clients 230A and B. For example, the intermediate module can expose device functionality of one or more peripheral devices as HTTP or REST HTTP to the mobile application 230A. In that sense, the intermediate module can be said to unify the APIs of two or more separate and unrelated peripheral devices. Put another way, the intermediate module can abstract the notion of peripheral device for the mobile application 230A. Many mobile applications are compatible with HTTP, and the handheld device 200, having the intermediate module 220, therefore is a flexible platform for many mobile application vendors in the realm 110 (FIG. 1). Also, if architectures involving HTTP compatible sensor clients are offered by several of the mobile device vendors in the realm 100 (FIG. 1), then this provides flexibility and more choices for the mobile application vendor.

The intermediate module can be implemented using any programming code or language. In some implementations, the intermediate module can be implemented using managed code such that the intermediate module runs in a virtual machine. Such an implementation can use the .NET framework technology developed by Microsoft Corp., for example together with C# code. As another example, the intermediate module can be implemented using native non-managed code, for example C++, on the handheld device 200, such that the intermediate module does not run in a virtual machine.

In short, therefore, the peripheral device (in this example RFID sensor 210) engages in communications and interactions with its client (here intermediate module 220) according to a proprietary protocol that is specific to the peripheral device, or to its class of devices. The intermediate module, in turn, exposes the peripheral-device functionality, for example in form of REST HTTP, to at least one application in an application layer in the mobile device. This allows one or more mobile application clients to function on the mobile device without being customized to the particular peripheral device (such as by integrating device drivers therein), and rather can consume its entire functionality through an HTTP interface. Also, if a mobile application client that is developed for a particular mobile platform is to be extended also to another platform, the application client may need to be modified or rewritten to be compatible, but if the new platform exposes peripheral-device functionality in a similar way, then the aspects of the application relating to peripherals need not be rewritten.

In some implementations, a standardized protocol may be chosen with which a browser (e.g., the client 230A) is not compatible. For example, it may be intended that the mobile application 230A and the intermediate module 220 communicate by another socket-based protocol such as UDP. The UDP protocol for datagrams sends short packages with generally less overhead than TCP, so it can be considered more efficient in the context of peripheral communications. In such situations, a plug-in 240 can be provided in the browser (e.g., here in the client 230A). The plug-in enables the browser to generate, and respond to, communications in a selected protocol. In some implementations, the intermediate module 220 is capable of communicating using multiple protocols. For example, the intermediate module may use HTTP with some mobile applications and UDP with others. In some implementations, the intermediate module 220 can maintain multiple such communications in parallel.

Figure 3:
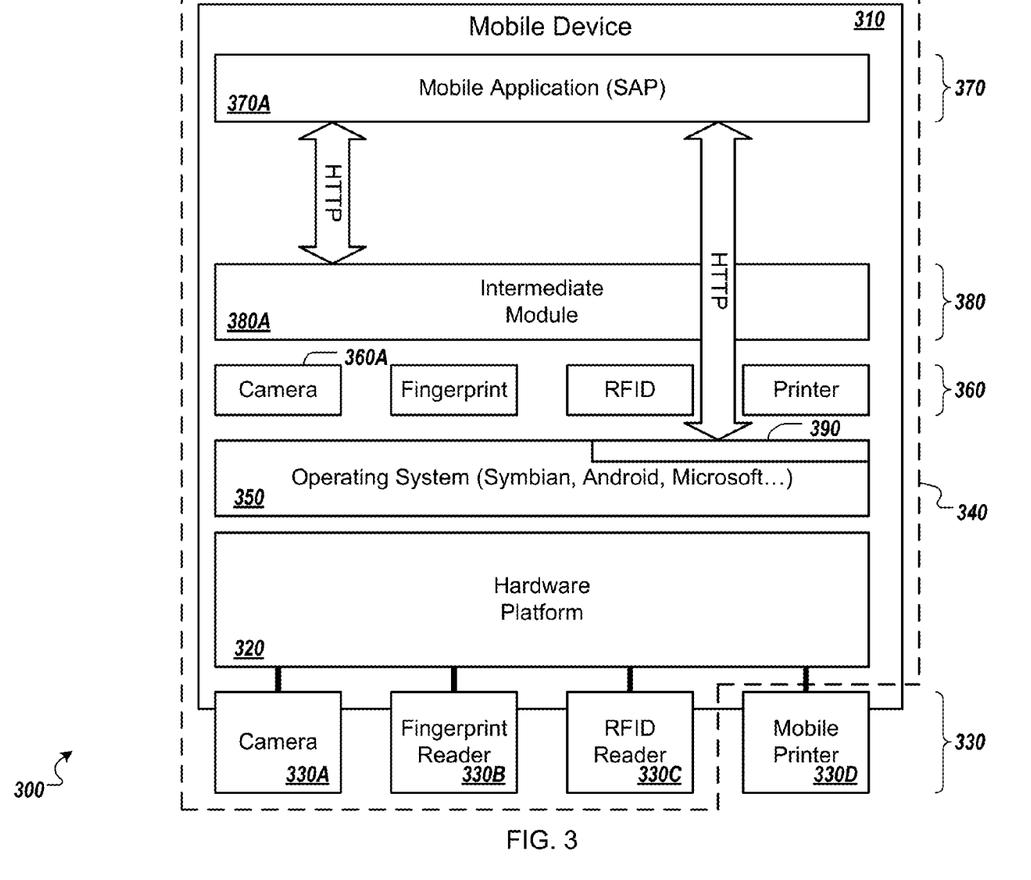
FIG. 3 shows an example of an architecture of a mobile device.

FIG. 3 shows an example of an architecture 300 of a mobile device. In some implementations, the architecture 300 is implemented in a mobile device designed to run one or more mobile applications, for example the mobile device 120 (FIG. 1) or the handheld device 200 (FIG. 2). Here, a mobile device 310 that uses the architecture 300 can be configured for personal wireless communication, such as in form of a smartphone or other cell phone.

The mobile device 310 is based on a hardware platform 320, which includes a power source, a radio antenna, a processor and memory for the mobile device to perform various functions. The platform can additionally include other components, such as one or more microprocessors. For example, the platform 320 can include an ARM architecture designed for cell phones.

The architecture 300 includes a peripheral layer 330 for one or more devices that the mobile device 310 interacts with. One or more devices can be integrated in a physical housing 340 of the mobile device, such as in a molded plastic shell. For example, the mobile device 310 can include a camera 330A, a fingerprint reader 330B and an RFID reader 330C. One or more peripheral devices can be standalone units or integrated in another device. For example, the mobile device 310 can be configured for interaction with a mobile printer 330D, for example using a proprietary print communication protocol over a wireless connection.

The mobile device 310 includes an operating system 350. The operating system 350 is compatible with the hardware platform 320 and provides the basic functionality of the mobile device, including the possibility to add one or more applications or programs to the device. In some implementations, any of multiple operating systems configured for use in smartphones, cell phones or other mobile personal digital devices can be used.

The architecture 300 can include a driver layer 360 with one or more drivers. For example, drivers for each device in peripheral layer 330 can be included in the driver layer 360. In some implementations, drivers are provided by the manufacturer of the mobile device, for example in form of C# or C++ code. Here, a camera driver 360A is designed to expose the functionality of the camera 330A, as an example of a driver. Drivers can include one or more libraries for use in interacting with the peripheral.

The architecture 300 includes an application layer 370 for one or more mobile applications. For example, the mobile application can be a mobile application client designed to communicate with a remote computer such as an ERP system. Here, an example mobile application client 370A is shown. The mobile application client 370A does not run inside a virtual machine but rather is non-managed. The driver layer 360 is not integrated into the mobile application 370 layer, and the mobile applications therefore need not be aware of the particulars of any specific peripheral device or how to communicate with it. Rather, the peripheral layer 330 and the driver layer 360 are decoupled from the mobile application layer 370.

The architecture 300 here includes an intermediate layer 380 configured to expose peripheral-device functionality to the mobile application layer 370 using an established and well known communication protocol, such as http. Particularly, the intermediate layer 380 can include an intermediate module 380A that is executed and run as a process above the operating system 350 much as the mobile application client 370A. In other words, the intermediate module 380A and the mobile application client 370A are examples of two processes implemented on the same mobile device to run in the same hardware platform and to communicate using a protocol such as HTTP.

The intermediate layer 380 can be considered as providing a mobile peripheral manager function to the mobile device 310, in that it allows for arbitrary control of peripherals. It may also have functions like logging of all communication with the peripheral(s), statistics and counting of successful and erroneous calls, warnings, last-used timestamp, etc. This information reduces troubleshooting time and improves business operations. When the mobile device or peripheral malfunctions, it is good to know whether it did so after performing thousands of operations, or only a few, regardless of how old the device is.

In some implementations, some or all intermediate functionality can be implemented by directly embedding it into the operating system. Here, an intermediate module 390 is shown in the operating system 350 and exposes peripheral functionality directly to the mobile application layer 370 using http. The intermediate module 390 can act as a mobile peripheral manager. In such implementations, the operating system may have direct access to the multiple peripheral devices, and some or all of the drivers in layer 360 can be omitted, for example.

Figure 4:
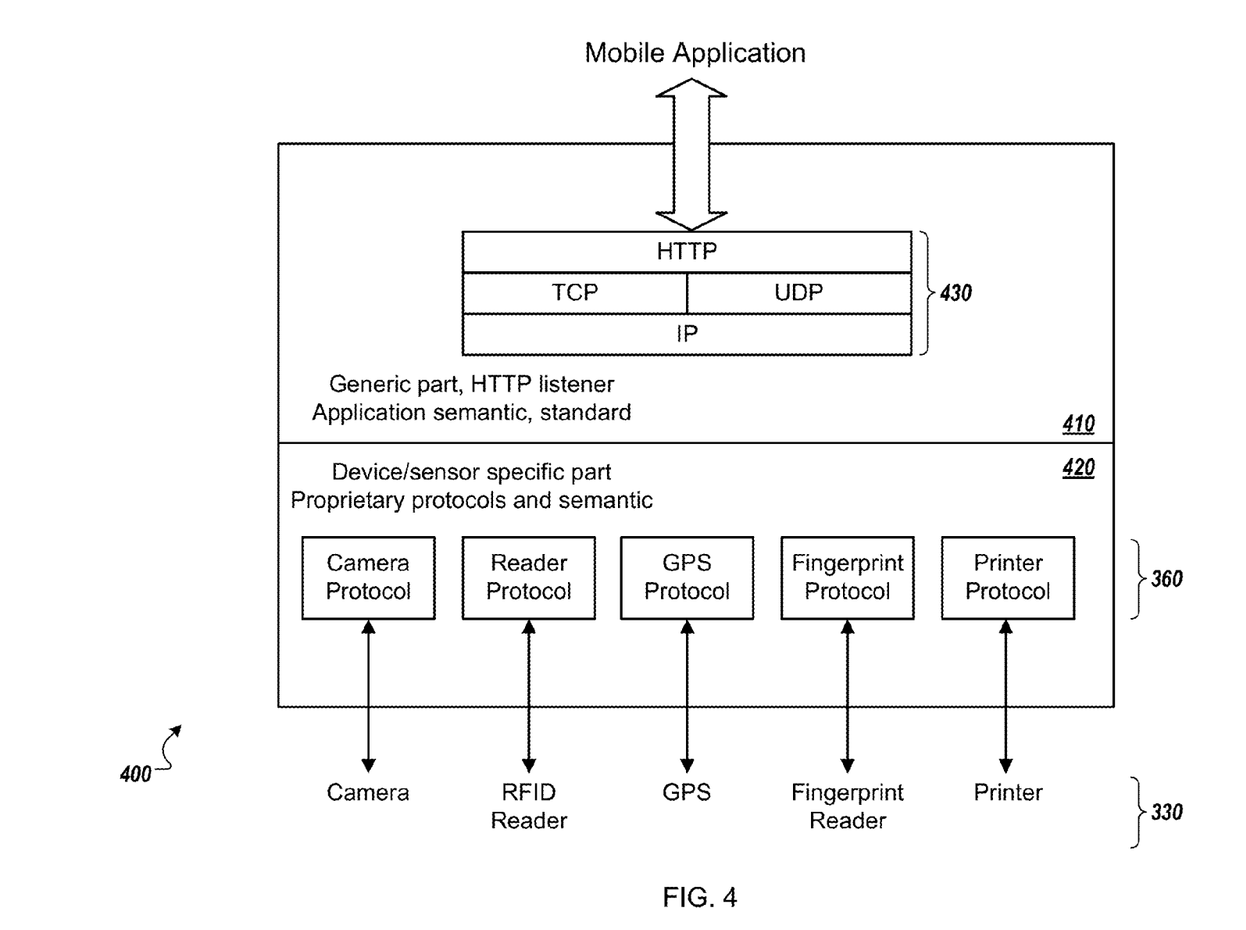
FIG. 4 shows an example of an intermediate module.

FIG. 4 shows an example of an intermediate module 400. The intermediate module 400 can be implemented in any mobile communication device, such as any of the mobile device 120 (FIG. 1), the handheld device 200 (FIG. 2), or the mobile device 310 (FIG. 3). The intermediate module 400 includes a generic part 410 and a device specific part 420. Here, the device specific part 420 includes the driver layer 360 and uses it to communicate with the peripheral device layer 330. Each peripheral device may interact using the same or a different protocol as another peripheral device.

The generic part 410 is configured to communicate using one or more standard network communications protocols, for example HTTP, TCP, UDP and IP as mentioned here. Accordingly, the intermediate module 400 uses the generic part 410 to expose functionality from the peripheral device layer 330.

Figure 5:
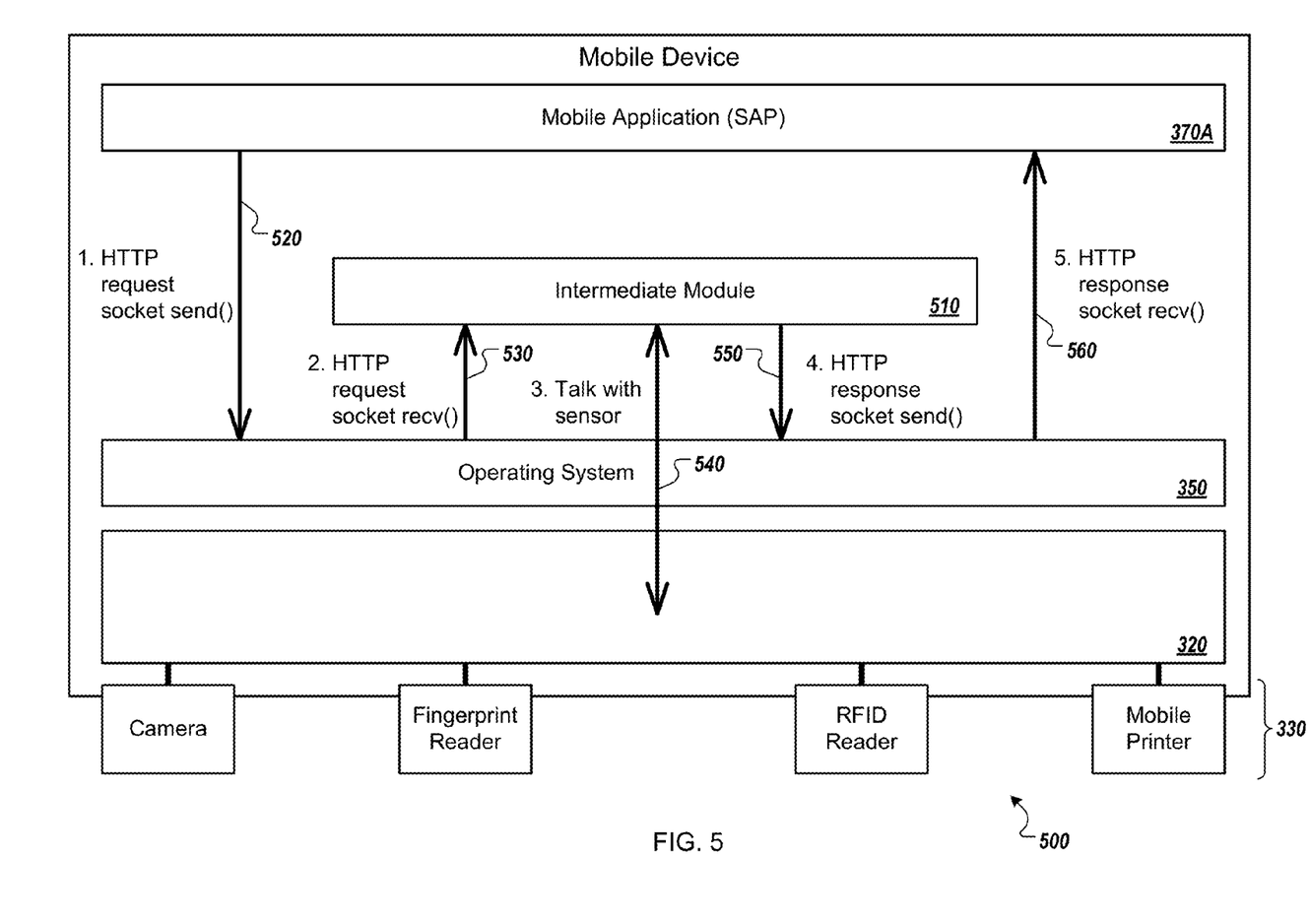
FIG. 5 shows an example of interactions in a mobile device.

FIG. 5 shows an example of interactions in a mobile device 500. Here, the mobile device includes the mobile application client 370A, the operating system 350, the hardware platform 320 and the peripheral layer 330. Also, the mobile device 500 includes an intermediate module 510 implemented by code executed on the mobile device 500. The intermediate module 510 is configured for socket based communication to and from the mobile application client 370A, for example according to a standard network communications protocol such as HTTP. In some implementations, the intermediate module 510 can include a generic part and a device specific part, similar to the intermediate module 400 (FIG. 4). Thus, the mobile application client 370A can interact with any device in the peripheral layer 330 without the peripheral device's driver being part of the application.

As indicated by an arrow 520, the mobile application client 370A can generate a command to control one or more peripheral devices. In some implementations, the command can include an HTTP GET, PUT or POST request, to name a few examples. The intermediate module 510 and the mobile application 370A first establish a socket connection. The mobile application can send a request to the intermediate module to execute operation(s) with a peripheral, for example to read an RFID tag ID or to set a configuration parameter, for example antenna power. This request is done by writing an HTTP request like for example GET, POST or PUT to socket. Request data is copied from mobile application memory space into kernel space of the operating system 350 and routed to application memory space of the intermediate module 510, as indicated by arrow 530. The intermediate module 510 can then read the mobile application request and perform one or more operations with the peripheral that is addressed by the request, as indicated by arrow 540. Addressing can be done by an HTTP request URI, or by payload.

The communication to the peripheral device is here not an HTTP communication, but rather conforms to a device-specific protocol used by the particular peripheral device. It may be an HTTP communication in case that peripheral device supports an HTTP protocol. For example, the communication can include a control signal or message for the peripheral device to make a reading. In an implementation where the peripheral device generates signals or data, the device can send it to the intermediate module in one or more communications.

After operations with the peripheral are completed, communication between the intermediate module and the peripheral is done using the peripheral's communication style, the intermediate module may send the result of these interactions back to the mobile application. The intermediate module does that by writing to socket (socket write). The data comes through OS kernel buffers to a read area of the mobile application socket and can be decoded and forwarded to a business application. With reference to the client/server paradigm, the intermediate module is the server for the mobile application because it provides services for peripheral integration and abstraction (e.g., using REST HTTP) of the peripherals' communication. From the socket communication perspective, on the other hand, both the intermediate module and the mobile application can read/write from/to the socket and could be called client and server, but for clarity this terminology is not used here.

The intermediate module, in turn, generates an appropriate response communication for receipt by the mobile application as sender of the command that prompted the interaction with the peripheral device. The communication corresponds to the signal or data received from the peripheral device. For example, the communication can include an HTTP response to the received HTTP request.

As indicated by an arrow 550, the intermediate module 570 sends the response back to the mobile application by writing to the socket. As indicated by an arrow 560, the operating system 350 forwards the response to the mobile application client 370A.

More or fewer communications can be used in some implementations. For example, more than one peripheral device and/or mobile application can be used. As another example, instead of the intermediate module 570 suitable code can be embedded in the operating system, similarly to the mobile peripheral manager 390 (FIG. 3).

Figure 6:
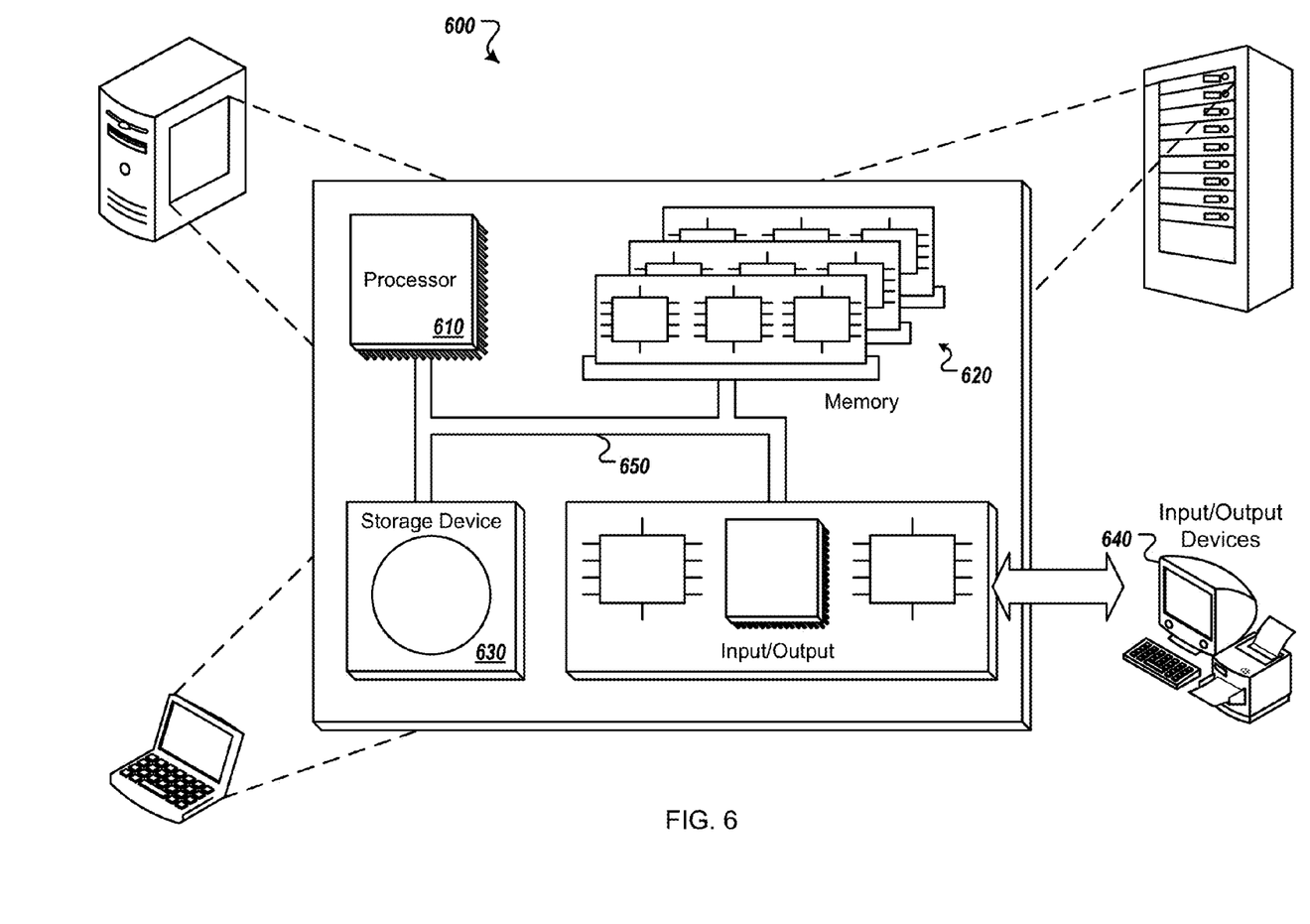
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 is a volatile memory unit in some implementations and is a non-volatile memory unit in other implementations.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method comprising:
  generating, using an application implemented by non-managed code on a first device, a command to an operating system of the first device, the command being socket based and conforming with a standard network communications protocol;
  forwarding the command from the operating system to a module on the first device, the module configured for socket based communication according to the standard network communications protocol, the command comprising an address of a second device;
  generating, using the module and according to a protocol specific to the second device, a command communication that instructs the second device to perform an operation based on the command, wherein the second device generates a response communication to the module according to the protocol;

generating, using the module, a socket based response to the operating system that is based on the response communication and that conforms with the standard network communications protocol; and forwarding the socket based response from the operating system for receipt by the application.

2. The computer-implemented method of claim 1, wherein the second device includes at least one device selected from: readers, RFID readers, barcode readers, fingerprint readers, sensors, movement sensors, vibration sensors, gyroscopes, temperature sensors, detectors, antennas, receivers, GPS receivers, cameras, microphones, printers, displays, projectors, speakers, and combinations thereof.

3. The computer-implemented method of claim 1, wherein the second device comprises a peripheral device integrated in a common physical housing with the first device, and wherein the first device comprises a mobile personal communication device.

4. The computer-implemented method of claim 1, wherein the second device is configured to generate signals or data, wherein the command includes an HTTP request, wherein the response communication includes the signals or data from the second device, and wherein the response includes an HTTP response to the application.

5. The computer-implemented method of claim 4, wherein the HTTP request and the HTTP response are generated in a socket created between the application and the module, both of which are running in a memory and a file system space of one hardware platform on the first device.

6. The computer-implemented method of claim 1, wherein the module comprises managed code and operates in a virtual machine implemented in a .NET framework.

7. The computer-implemented method of claim 1, wherein the module comprises non-managed code and is not included in a virtual machine.

8. The computer-implemented method of claim 1, wherein the operating system has direct access to multiple devices including the second device, and wherein the module comprises a code-based device manager embedded in the operating system.

9. The computer-implemented method of claim 1, wherein the module is implemented in a layer above the operating system, the layer unifying, on a device side, APIs of multiple devices including the second device, by exposing functionality of the multiple devices to the application on an application side.

10. The computer-implemented method of claim 1, wherein the application is implemented using javascript code in a browser running on the first device.

11. The computer-implemented method of claim 10, wherein the browser is provided with a plug-in application for communication with the module using a specific standard communication protocol, wherein the module exchanges the command and the socket based response using the specific standard communication protocol.

12. The computer-implemented method of claim 11, wherein the module alternates between the specific standard communication protocol and the standard communication protocol.

13. The computer-implemented method of claim 11, wherein the module handles, in parallel, a first application communication using the specific standard communication protocol and a second communication using the standard communication protocol.

14. A computer program product embodied in a non-transitory computer-readable storage medium and comprising instructions that when executed by a processor perform a method comprising:

generating, using an application implemented by non-managed code on a first device, a command to an operating system of the first device, the command being socket based and conforming with a standard network communications protocol;

forwarding the command from the operating system to a module on the first device, the module configured for socket based communication according to the standard network communications protocol, the command comprising an address of a second device;

generating, using the module and according to a protocol specific to the second device, a command communication that instructs the second device to perform an operation based on the command, wherein the second device generates a response communication to the module according to the protocol;

generating, using the module, a socket based response to the operating system that is based on the response communication and that conforms with the standard network communications protocol; and forwarding the socket based response from the operating system for receipt by the application.

15. The computer program product of claim 14, wherein the module is implemented in a layer above the operating system, the layer unifying, on a device side, APIs of multiple devices including the second device, by exposing functionality of the multiple devices to the application on an application side.

16. A system comprising:

one or more processors for a device; and a non-transitory storage including code that when executed by the one or more processors generates a module configured to:

receive, from an operating system of the device, a socket based command that the operating system forwarded to the module as a result of the operating system having received the socket based command from an application implemented by non-managed code, the socket based command conforming with a standard network communications protocol and comprising an address of another device, generate, according to a protocol specific to the another device, a command communication that instructs the other device to perform an operation based on the command, receive, from the other device, a response communication that the other device generated in response to the other device receiving the command communication from the module, the response communication being in accordance with the protocol that is specific to the other device, and generate, for receipt by the operating system, a socket based response that is based on the response communication and that conforms with the standard network communications protocol, and that the operating system is to forward to the application that is implemented by non-managed code.

17. The system of claim 16, wherein the module comprises managed code and operates in a virtual machine implemented in a .NET framework.

18. The system of claim 16, wherein the module comprises non-managed code and is not included in a virtual machine.

19. The system of claim 16, wherein the operating system has direct access to multiple devices including the other device, wherein the module comprises a code-based device manager which is embedded in the operating system.

20. The system of claim 16, wherein the module is implemented in a layer above the operating system, the layer unifying, on a device side, APIs of multiple devices including the other device, by exposing functionality of the multiple devices to the application on an application side.

* * * * *